United States Patent
Millet et al.

(10) Patent No.: US 9,188,150 B2
(45) Date of Patent: Nov. 17, 2015

(54) SPACER ADJUSTABLE IN LENGTH

(75) Inventors: Gerard Millet, Pibrac (FR); Xavier Bernard, Bruges (FR)

(73) Assignee: AIRBUS OPERATIONS (SAS), Toulouse (FR)

(*) Notice: Subject to any disclaimer, the term of this patent is extended or adjusted under 35 U.S.C. 154(b) by 273 days.

(21) Appl. No.: 13/536,179

(22) Filed: Jun. 28, 2012

(65) Prior Publication Data
US 2013/0004264 A1 Jan. 3, 2013

(30) Foreign Application Priority Data

Jun. 30, 2011 (FR) .................................... 11 55866

(51) Int. Cl.
- F16B 43/00 (2006.01)
- F16B 5/02 (2006.01)
- F16B 21/18 (2006.01)

(52) U.S. Cl.
CPC ............. F16B 43/007 (2013.01); F16B 5/0233 (2013.01); F16B 21/186 (2013.01)

(58) Field of Classification Search
CPC ...... F16B 5/0233; F16B 43/00; F16B 21/086; F16B 5/065; F16B 21/084; F16B 21/08; F16B 43/007; F16B 35/06; F16B 21/16
USPC ................. 411/546, 535, 508–510, 539, 378
See application file for complete search history.

(56) References Cited

U.S. PATENT DOCUMENTS

| | | | | |
|---|---|---|---|---|
| 2,358,606 A | * | 9/1944 | Summers | 411/539 |
| 2,431,154 A | * | 11/1947 | Wikstrom | 285/149.1 |
| 2,797,605 A | * | 7/1957 | Metze, Jr. et al. | 411/339 |
| 3,115,804 A | * | 12/1963 | Johnson | 411/338 |
| 4,274,323 A | * | 6/1981 | Resnicow | 411/433 |
| 4,556,352 A | * | 12/1985 | Resnicow | 411/433 |
| 4,604,014 A | * | 8/1986 | Frano | 411/338 |
| 4,712,492 A | * | 12/1987 | Murray | 111/136 |
| 6,345,946 B1 | * | 2/2002 | Mainini et al. | 411/508 |
| 2008/0145180 A1 | | 6/2008 | Hermann et al. | |

FOREIGN PATENT DOCUMENTS

| | | |
|---|---|---|
| EP | 0 492 289 A1 | 7/1992 |
| EP | 1 122 384 A1 | 8/2001 |
| GB | 2 344 136 A | 5/2000 |
| WO | 2008/046436 A1 | 4/2008 |

OTHER PUBLICATIONS

French Search Report, dated Feb. 8, 2012, from corresponding French application.

* cited by examiner

*Primary Examiner* — Roberta Delisle

(74) *Attorney, Agent, or Firm* — Young & Thompson

(57) ABSTRACT

A crosspiece including two terminal surfaces (22.1, 22.2) and a pipe (24) with a longitudinal axis (26) that is essentially perpendicular to the terminal surfaces (22.1, 22.2), includes two parts (40.1, 40.2), each having a terminal surface (22.1, 22.2), a first part (40.1) including at least one edge (48) that can be flattened against an edge (48) of the other part (40.2), with the edges having shapes that immobilize the two parts in the direction of the longitudinal axis (26) that makes it possible to adjust the relative position of the two parts in such a way as to obtain a desired length between the terminal surfaces.

18 Claims, 4 Drawing Sheets

Figure 1:
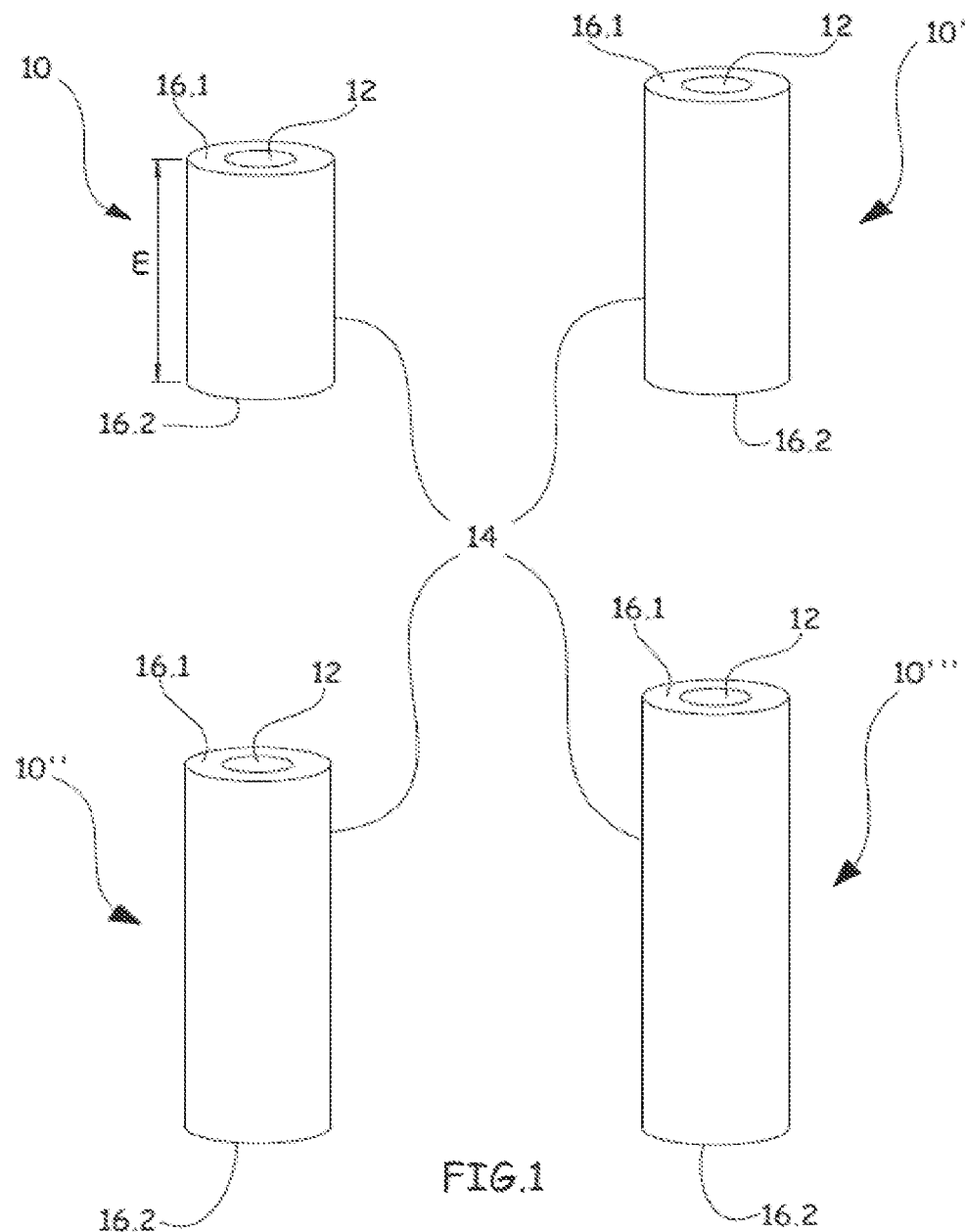

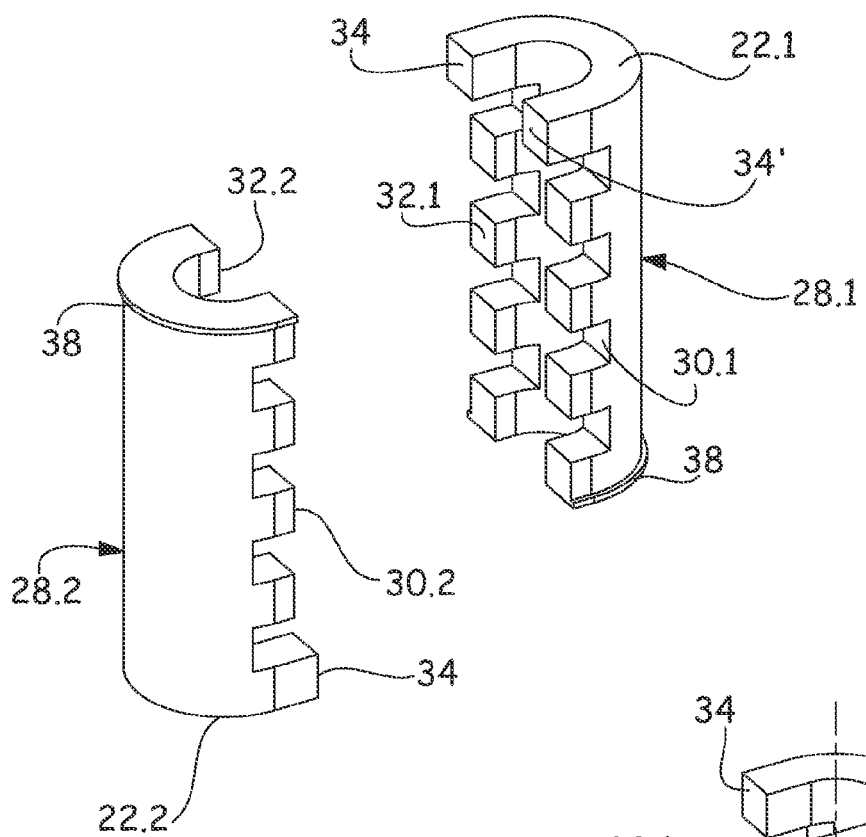
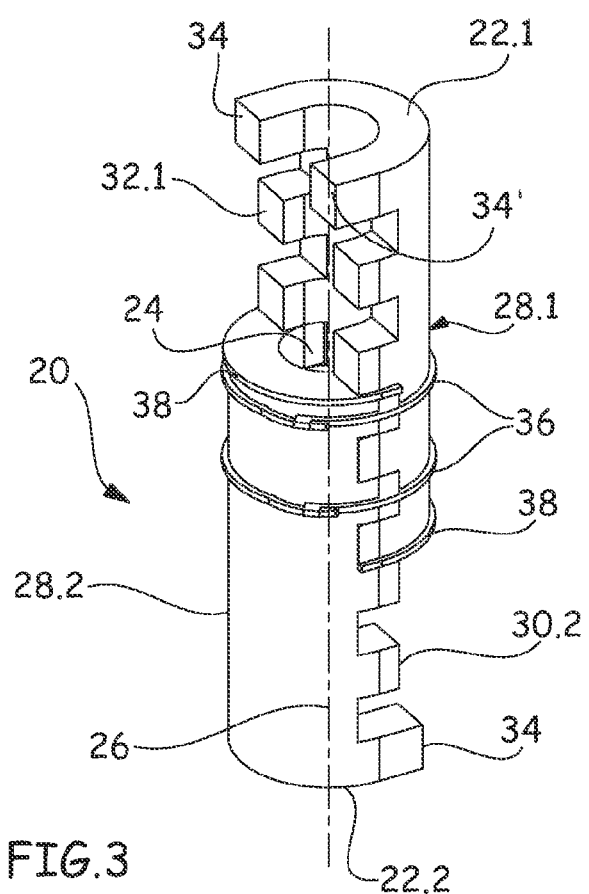
FIG.2
FIG.3

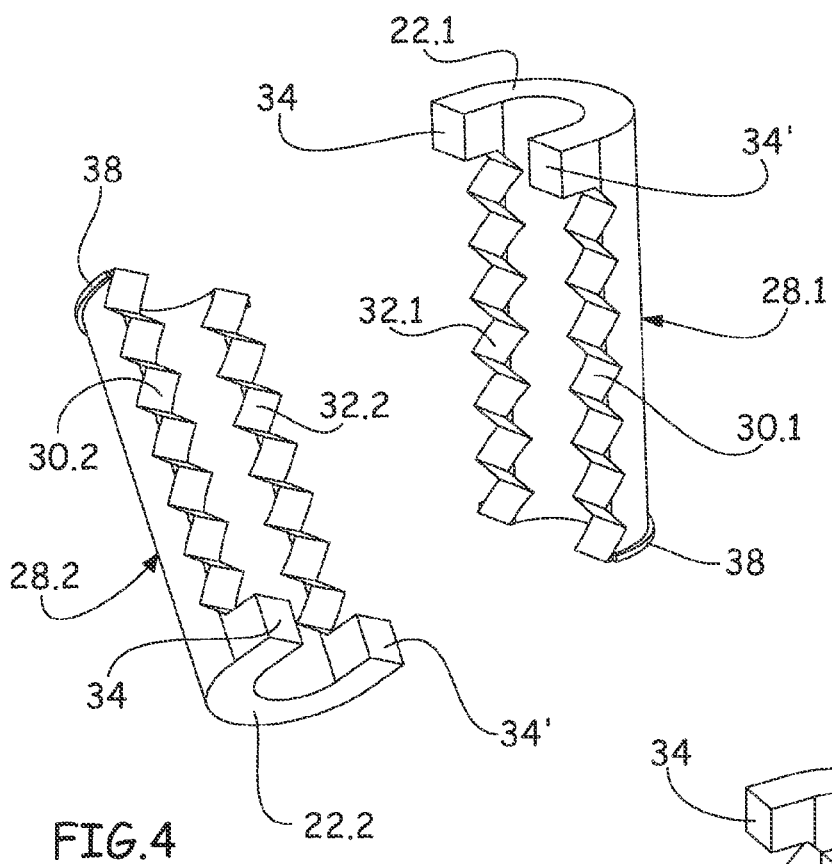
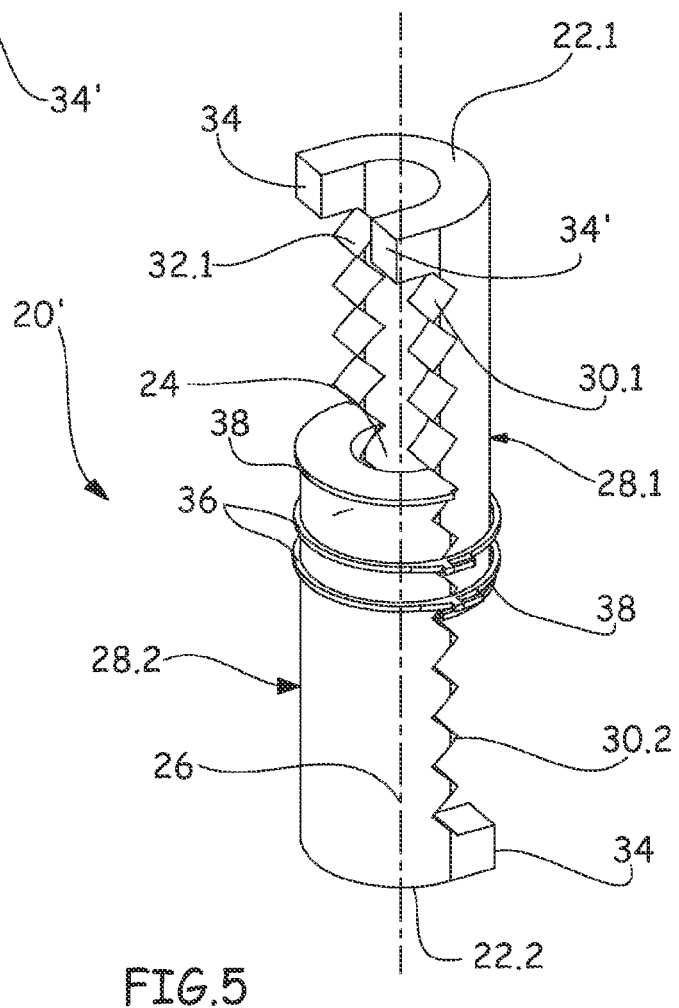

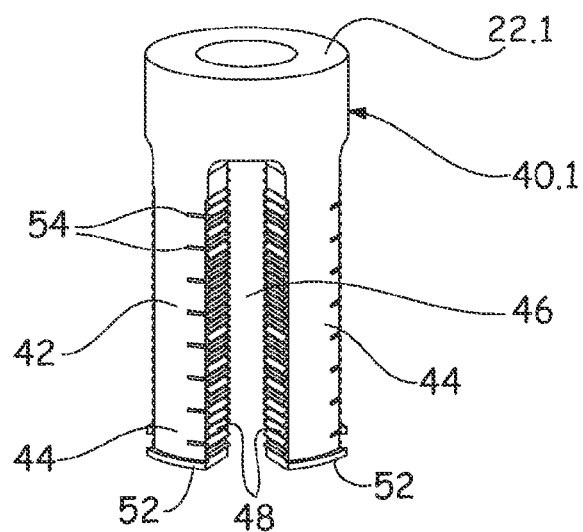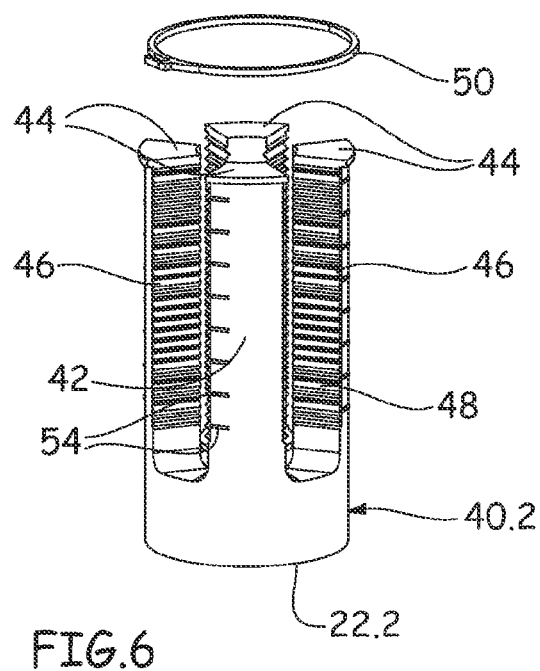
FIG.6
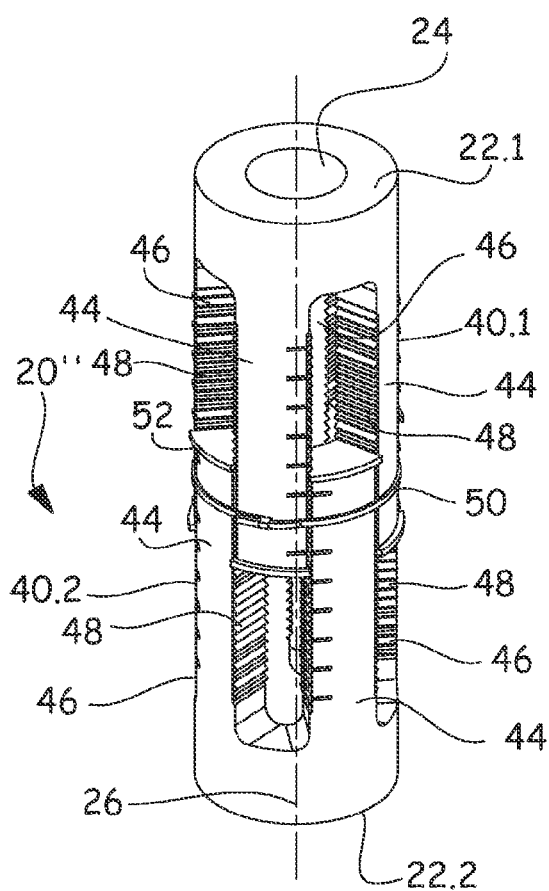
FIG.7

SPACER ADJUSTABLE IN LENGTH

BACKGROUND OF THE INVENTION

1. Field of the Invention

This invention relates to an adjustable-length crosspiece.

2. Description of the Related Art

FIG. 1 shows several crosspieces 10, 10', 10" and 10'".

In a known manner, a crosspiece comes in the form of a tube with a cylindrical inside wall 12, a cylindrical outside wall 14, and two terminal surfaces 16.1 and 16.2.

On the functional level, a crosspiece makes it possible to maintain a spacing E between two parts. It comprises a longitudinal through hole, bordered by the inside wall 12, making it possible to house an element for holding the crosspiece, for example a rod that in general ensures the connection between the two parts that are kept apart by the crosspiece.

In terms of dimensions, the thickness of the crosspiece that corresponds to the distance that separates the inside wall 12 from the outside wall 14 is sized based on stresses applied to the crosspiece, in particular based on compression and buckling stresses. The length of the crosspiece that corresponds to the distance that separates the two terminal surfaces 16.1 and 16.2 is sized based on the spacing E that is desired between the parts that are kept apart by the crosspiece.

In the case of an electrical installation of an aircraft, there are different crosspiece models whose length varies from one model to the next.

This diversity of lengths of crosspieces is relatively problematic within the framework of maintenance. Actually, the operator responsible for maintenance is to have available a large number of models of different lengths so as to be able to replace the crosspieces that are in place with crosspieces that are identical in terms of length. This diversity of models triggers problems in terms of management of stocks so that the operator always has the model with the proper length at his disposal. If the corresponding model is not available, the operator may be induced to cut a crosspiece of greater length, which is reflected by a time loss, or be tempted to use another crosspiece model with a close length that may trigger malfunctions.

SUMMARY OF THE INVENTION

Also, the purpose of this invention is to remedy the drawbacks of the prior art by proposing a crosspiece with an adjustable length.

For this purpose, the invention has as its object a crosspiece that comprises two terminal surfaces and a pipe with a longitudinal axis that is essentially perpendicular to the terminal surfaces, characterized in that it comprises two parts, each comprising a terminal surface, a first part comprising at least one edge that can be flattened against an edge of the other part, the edges having shapes that immobilize the two parts in the direction of the longitudinal axis that makes it possible to adjust the relative position of the two parts in such a way as to obtain a desired length between the terminal surfaces.

BRIEF DESCRIPTION OF THE DRAWING FIGURES

Other characteristics and advantages will emerge from the following description of the invention, a description that is provided only by way of example, relative to the accompanying drawings, in which:

FIG. 1 is a perspective view of crosspieces according to the prior art,

FIG. 2 is a perspective view of an unassembled crosspiece according to a first variant of the invention, FIG. 3 is a perspective view of the assembled crosspiece of FIG. 2, FIG. 4 is a perspective view of an unassembled crosspiece according to another variant of the invention, FIG. 5 is a perspective view of the assembled crosspiece of FIG. 4, FIG. 6 is a perspective view of an unassembled crosspiece according to another variant of the invention, and FIG. 7 is a perspective view of the assembled crosspiece of FIG. 6.

DETAILED DESCRIPTION OF THE INVENTION

FIGS. 2 to 7 show crosspieces 20, 20', 20" according to the invention.

These crosspieces 20, 20', 20" comprise two terminal surfaces 22.1 and 22.2, essentially parallel, and a pipe 24 with a longitudinal axis 26 that is essentially perpendicular to the terminal surfaces 22.1 and 22.2.

According to the invention, a crosspiece 20, 20', 20" comprises two parts that can occupy two states, a first unassembled state (FIGS. 2, 4 and 6), in which they can be positioned relative to one another along the longitudinal axis 26, and a second assembled state (FIGS. 3, 5, and 7), in which they are immobilized relative to one another, with the first part comprising a first terminal surface 22.1 and the other part comprising the other terminal surface 22.2.

According to the first variants that are illustrated in FIGS. 2 to 5, the first and second parts come in the form of two half-cylinders 28.1 and 28.2 that when they are assembled border the pipe 24. The two half-cylinders 28.1 and 28.2 each have two edges 30.1 and 32.1, 30.2 and 32.2. When the two parts are assembled, the edge 30.1 works with the edge 30.2, and the edge 32.1 works with the edge 32.2.

Preferably, the mid-plane of each edge 30.1, 30.2, 32.1, 32.2 is parallel to the longitudinal axis 26.

According to a characteristic of the invention, the edges 30.1 and 30.2 (respectively 32.1 and 32.2), arranged opposite, comprise shapes that immobilize the two half-cylinders 28.1 and 28.2 relative to one another in the direction of the longitudinal axis 26, when the edges are held against one another. The shapes of the edges 30.1 and 30.2 make it possible to immobilize the two half-cylinders 28.1 and 28.2 in different configurations, more or less offset in the direction of the longitudinal axis 26 so as to allow an adjustment of the length of the crosspiece.

According to a variant that is illustrated in FIGS. 2 and 3, the edges 30.1, 30.2, 32.1 and 32.2 have castellated shapes.

According to another variant that is illustrated in FIGS. 4 and 5, the edges 30.1, 30.2, 32.1 and 32.2 have sawtoothed shapes.

Preferably, the edges of the same half-cylinder are identical. As a variant, the profiles could be different from one edge to the next for the same half-cylinder.

According to a preferred embodiment, the two half-cylinders 28.1 and 28.2 are identical and are arranged head to foot when they are assembled.

Advantageously, the half-cylinders 28.1 and 28.2 comprise protuberances 34, 34' at the ends of the edges corresponding to the terminal surface for increasing the surface area of the terminal surfaces 22.1 and 22.2. Thus, in top view, the terminal surfaces have a U-shaped profile.

Preferably, the crosspiece comprises means for keeping the two parts 28.1 and 28.2 assembled. Advantageously, at least one link 36 that forms a loop is used to clamp the two half-cylinders 28.1 and 28.2. According to one embodiment, the link 36 comes in the form of a tightening collar, such as, for example, the one that is marketed under the name "tyrap." According to the embodiment that is illustrated in FIGS. 3 and 5, two links 36 are used to clamp the two half-cylinders and to keep them in the desired position.

Preferably, at the end that is opposite to the one forming the terminal surface 22.1 or 22.2, the outside surface comprises a collar 38 that projects relative to the outside surface. With the two half-cylinders being arranged head to foot, the links 36 are arranged between the collars 38 that keep the links 36 from sliding along the two half-cylinders.

Regardless of the length of the desired crosspiece, the operator always uses the same half-cylinders. He arranges them head to foot, adjusts their relative position so as to obtain the length that is suitable between the terminal surfaces, and then connects them by using at least one link 36.

The invention makes it possible to simplify the management of the stocks to the extent where starting from completely identical half-cylinders, the operator can create crosspieces of different lengths.

In FIGS. 6 and 7, another crosspiece variant according to the invention is illustrated.

According to this variant, each part comes in the form of a hollow cylinder 40.1 and 40.2 with an inside surface and an outside surface 42, each cylinder comprising at least one foot and at least one recess, preferably feet 44 that are separated by recesses 46, and with the feet 44 of a first cylinder 40.1 being able to be housed in the recesses 46 of the other cylinder 40.2 and vice versa in such a way as to form a crosspiece as illustrated in FIG. 7.

Advantageously, the two cylinders 40.1 and 40.2 are identical and comprise the same number of feet and recesses.

According to the embodiment that is illustrated in FIGS. 6 and 7, each cylinder comprises four feet 44 and four recesses 46, each foot or recess extending over $\frac{1}{8}^{th}$ of the circumference. Advantageously, the feet are distributed over the circumference and extend over $1/(2n)$ of the circumference, with n being the number of feet.

Each foot 44 is bordered by a portion of the outside surface of the cylinder, with a portion of the inside surface of the cylinder and two edges 48 arranged in planes containing the longitudinal axis 26.

According to a characteristic of the invention, the edges 48 of the feet 44 comprise shapes that immobilize the two cylinders 40.1 and 40.2 relative to one another in the direction of the longitudinal axis 26, when the edges are held against one another.

The edges 48 comprise catches, a sawtoothed profile, or any other shape that limits the relative movement in the longitudinal direction of the two cylinders 40.1 and 40.2.

According to this variant, the length of the crosspiece is adjusted by making the feet 44 penetrate more or less into the recesses 46. Preferably, the feet 44 can have a certain flexibility for opening out and facilitating the interlocking of the two cylinders 40.1 and 40.2 in one another.

As for the preceding variants, the crosspiece comprises at least one link 50 that forms a loop for holding the two cylinders 40.1 and 40.2. According to one embodiment, the link 50 comes in the form of a tightening collar, such as, for example, the one that is marketed under the name "tyrap."

Preferably, at the end of the feet 44, the outside surface comprises a collar 52 that projects relative to the outside surface. With the two cylinders being arranged upside-down, the link 50 is arranged between the collars 52 that keep the link 50 from sliding along the cylinders.

Regardless of the desired length of the crosspiece, the operator always uses the same cylinders. Two of them are arranged in inverted position, their relative position is adjusted in such a way as to obtain a suitable length between the terminal surfaces, and then they are connected by using at least one link 50.

The invention makes it possible to simplify the management of stocks to the extent that, starting from completely identical cylinders, the operator can create crosspieces of different lengths.

Regardless of the variant, to facilitate the adjustment of the length, the outside surfaces of the half-cylinders or cylinders can comprise reference marks 54 (or graduations). According to one embodiment, these reference marks 54 are distributed along one edge of the cylinder or half-cylinder that is parallel to the longitudinal direction.

Regardless of the variant, the crosspiece is made in two parts, each comprising a terminal surface, a first part comprising at least one edge that can be flattened against one edge of the other part, with the edges having shapes that immobilize the two parts in the direction of the longitudinal axis 26.

Advantageously, the edges comprise non-coplanar facets, separated by ridges that are perpendicular to the direction of the longitudinal axis 26.

Preferably, at or near the end that is opposite to the one that forms the terminal surface, the outside surface of the two parts that form the crosspiece comprises a collar that projects relative to the outside surface. When the two parts are in assembled position, the link(s) used for keeping them in this position are arranged between the collars that keep the link(s) from sliding along the two parts.

The invention claimed is:

1. A crosspiece, comprising:
    a first part having a first terminal surface and a first edge distal to the first terminal surface;
    a second part having a second terminal surface and a second edge distal to the second terminal surface;
    a hollow bore formed from the first and second parts, the hollow bore having a longitudinal axis that is essentially perpendicular to the first and second terminal surfaces; and
    a clamp to keep the two parts assembled,
    wherein the first and second edges can be flattened against each other with the first and second edges having shapes that immobilize the first and second parts in a direction of the longitudinal axis so as to adjust the relative position of the first and second parts in such a way as to obtain a desired length between the first and second terminal surfaces, and
    the crosspiece can occupy only two states, a first unassembled state in which the first and second parts can be relative to one another along the longitudinal axis, and a second assembled state in which the first and second parts are immobilized relative to one another.

2. The crosspiece according to claim 1, wherein the first and second parts respectively comprise first and second half-cylinders.

3. The crosspiece according to claim 2, wherein the first and second half cylinders comprise two identical half-cylinders, arranged head to foot.

4. The crosspiece according to claim 3, wherein each half-cylinder comprises protuberances at ends of the first and second edges corresponding to the terminal surface for increasing the surface area of said first and second terminal surfaces.

5. The crosspiece according to claim 2, wherein each half-cylinder comprises protuberances at ends of the first and second edges corresponding to the terminal surface for increasing the surface area of said first and second terminal surfaces.

6. The crosspiece according to claim 2, wherein each terminal surface has a U-shaped profile.

7. The crosspiece according to claim 1, wherein the first and second parts respectively comprise first and second hollow cylinders that each comprises at least one foot and at least one recess, with the foot or feet of the first hollow cylinder being able to be housed in the recess(es) of the second hollow cylinder and vice versa in such a way as to form the crosspiece.

8. The crosspiece according to claim 7, wherein the first and second hollow cylinders are identical and arranged in an inverted position.

9. The crosspiece according to claim 7, wherein each hollow cylinder comprises four feet and four recesses, and each foot or recess extends over 1/8 of a circumference of the respective hollow cylinder.

10. The crosspiece according to claim 7, wherein each hollow cylinder comprises plurality of feet interspaced by a plurality of recesses, and the plurality of feet are distributed over a circumference of the respective hollow cylinder and extend over 1/(2n) of the circumference with n being a number of feet.

11. The crosspiece according to claim 1, wherein the first and second edges each comprise a plurality of non-coplanar facets, separated by ridges that are perpendicular to the direction of the longitudinal axis.

12. The crosspiece according to claim 1, wherein the clamp comprises at least one link in a form of a tightening collar.

13. The crosspiece according to claim 1, wherein each part comprises a collar at an outside surface and close to an end of the crosspiece.

14. The crosspiece according to claim 1, wherein the crosspiece further comprises at an outside surface, reference marks for facilitating an adjustment of the length.

15. A crosspiece, comprising:
a first part having a first terminal surface and a first edge distal to the first terminal surface;
a second part having a second terminal surface and a second edge distal to the second terminal surface, the second part being identical to the first part;
a hollow bore formed from the first and second parts, the hollow bore having a longitudinal axis that is essentially perpendicular to the first and second terminal surfaces; and
a clamp to keep the two parts assembled,
wherein the first and second edges can be flattened against each other with the first and second edges having shapes that immobilize the first and second parts in a direction of the longitudinal axis so as to adjust a relative position of the first and second parts in such a way as to obtain a desired length between the first and second terminal surfaces, and
the crosspiece can occupy only two states, a first unassembled state in which the first and second parts can be relative to one another along the longitudinal axis, and a second assembled state in which the first and second parts are immobilized relative to one another.

16. The crosspiece according to claim 15, wherein the first and second parts respectively comprise first and second half-cylinders arranged head to foot.

17. The crosspiece according to claim 16, wherein each half-cylinder comprises protuberances at ends of the first and second edges corresponding to the terminal surface for increasing the surface area of said first and second terminal surfaces.

18. The crosspiece according to claim 15, wherein the first and second parts respectively comprise first and second inverted hollow cylinders that each comprises at least one foot and at least one recess, with the foot or feet of the first hollow cylinder being able to be housed in the recess(es) of the second hollow cylinder and vice versa in such a way as to form the crosspiece.

* * * * *